United States Patent
Ballard

(10) Patent No.: US 8,474,532 B2
(45) Date of Patent: Jul. 2, 2013

(54) INVERT SILICATE FLUIDS FOR WELLBORE STRENGTHENING

(75) Inventor: David Antony Ballard, Aberdeenshire (GB)

(73) Assignee: M-1 Drilling Fluids U.K. Limited, Aberdeen, Aberdeenshire (GB)

( * ) Notice: Subject to any disclaimer, the term of this patent is extended or adjusted under 35 U.S.C. 154(b) by 224 days.

(21) Appl. No.: 12/745,769

(22) PCT Filed: Dec. 3, 2008

(86) PCT No.: PCT/IB2008/003918
§ 371 (c)(1),
(2), (4) Date: Jun. 2, 2010

(87) PCT Pub. No.: WO2010/015879
PCT Pub. Date: Feb. 11, 2010

(65) Prior Publication Data
US 2010/0258313 A1 Oct. 14, 2010

Related U.S. Application Data

(60) Provisional application No. 61/013,135, filed on Dec. 12, 2007.

(51) Int. Cl.
*C09K 8/58* (2006.01)

(52) U.S. Cl.
USPC ........................................ 166/300; 166/305.1

(58) Field of Classification Search
None
See application file for complete search history.

(56) References Cited

U.S. PATENT DOCUMENTS

| | | | |
|---|---|---|---|
| 3,060,210 A | | 10/1962 | Melvin et al. |
| 3,593,796 A | * | 7/1971 | Stainback et al. ............ 166/288 |
| 4,662,448 A | | 5/1987 | Ashford et al. |
| 4,799,549 A | * | 1/1989 | Vinot et al. ................... 166/293 |
| 4,819,723 A | * | 4/1989 | Whitfill et al. ................ 166/248 |
| 4,891,072 A | | 1/1990 | Cooper |
| 5,213,160 A | | 5/1993 | Nahm et al. |
| 5,678,632 A | | 10/1997 | Moses et al. |
| 6,315,042 B1 | | 11/2001 | Griffith et al. |
| 6,325,149 B1 | | 12/2001 | Dobson, Jr. et al. |
| 6,367,548 B1 | | 4/2002 | Purvis et al. |
| 6,666,268 B2 | | 12/2003 | Griffith et al. |
| 6,668,929 B2 | | 12/2003 | Griffith et al. |
| 6,716,282 B2 | | 4/2004 | Griffith et al. |
| 6,763,888 B1 | | 7/2004 | Harris et al. |
| 6,790,812 B2 | | 9/2004 | Halliday et al. |
| 6,815,399 B1 | | 11/2004 | Johnson et al. |
| 6,818,598 B2 | | 11/2004 | Maberry et al. |
| 7,259,130 B2 | | 8/2007 | Griffith et al. |
| 7,740,068 B2 | * | 6/2010 | Ballard ......................... 166/294 |

FOREIGN PATENT DOCUMENTS

| | | |
|---|---|---|
| GB | 2309240 A | 7/1997 |
| WO | 2008100810 A2 | 8/2008 |

OTHER PUBLICATIONS

Office Action issued in the corresponding European Application No. 08874844.7 dated Jan. 19, 2011 (6 pages).
Office Action issued in corresponding Eurasian Application No. 201070721 dated Nov. 23, 2011 (2 pages).
Office Action issued in corresponding Canadian Application No. 2,708,475 dated Aug. 12, 2011 (2 pages).
Search Report issued in corresponding European Application No. 08874844.7 dated Novebmer 3, 2011 (7 pages).
International Search Report issued in PCT/IB2008/003918, mailed on Feb. 4, 2010, 3 pages.
Written Opinion issued in PCT/IB2008/003918, mailed on Feb. 4, 2010, 8 pages.
Examiner's Report filed under Canadian Application No. 2708475 file Mar. 8, 2012 (2 pages).
Office Action (w/translation) issued Aug. 30, 2012 in corresponding Eurasian application No. 201070721 (4 pages).
Office Action issued Oct. 5, 2012 in corresponding Canadian application No. 2,708,475 (2 pages).

* cited by examiner

*Primary Examiner* — Angela M DiTrani
(74) *Attorney, Agent, or Firm* — Osha • Liang LLP

(57) ABSTRACT

A wellbore fluid that includes an oleaginous continuous phase; a non-oleaginous discontinuous phase comprising a water-soluble silicate therein; and an emulsifier to stabilize the non-oleaginous phase dispersed in the oleaginous phase is disclosed. A setting agent, including organic or inorganic setting agent may optionally be included to trigger gelation or precipitation of the silicate downhole.

12 Claims, No Drawings

INVERT SILICATE FLUIDS FOR WELLBORE STRENGTHENING

BACKGROUND OF INVENTION

1. Field of the Invention

Embodiments disclosed herein relate generally to fluids and methods for improving wellbore strength, and more particularly, to fluids and methods to consolidate and stabilize the wellbore.

2. Background Art

Lost circulation is a recurring drilling problem, characterized by loss of drilling mud into downhole formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

During the drilling process, muds are circulated downhole to remove rock as well as deliver agents to combat the variety of issues described above. Mud compositions may be water or oil-based (including mineral oil, diesel, or synthetic oils) and may comprise weighting agents, surfactants, proppants, and gels. In attempting to cure these and other problems, crosslinkable or absorbing polymers, loss control material (LCM) pills, and cement squeezes have been employed. Gels, in particular, have found utility in preventing mud loss, stabilizing and strengthening the wellbore, and zone isolation and water shutoff treatments.

In many wells, water-based and oil-based muds are both used. Water-based muds are generally used early in the drilling process. Later, oil-based muds are substituted as the well gets deeper and reaches the limit of water-based muds due to limitations such as lubricity and well bore stabilization. The majority of gels employ water compatible gelling and crosslinking agents, which are useful when using water-based muds. There is, however, a dearth of methods using wellbore strengthening agents which are compatible with oil-based muds.

Thus, there is a need for the development of fluids and methods of strengthening a wellbore that are relatively environmentally safe and compatible with oil-based muds.

SUMMARY OF INVENTION

In one aspect, embodiments disclosed herein relate to a wellbore fluid that includes an oleaginous continuous phase; a non-oleaginous discontinuous phase comprising a water-soluble silicate therein; and an emulsifier to stabilize the non-oleaginous phase dispersed in the oleaginous phase.

In another aspect, embodiments disclosed herein relate to a wellbore fluid that includes an oleaginous continuous phase comprising at least one hydrolysable ester; a non-oleaginous discontinuous phase comprising a water-soluble silicate therein; and an emulsifier to stabilize the non-oleaginous phase dispersed in the oleaginous phase.

In another aspect, embodiments disclosed herein relate to a method of treating an earth formation that includes emplacing an invert emulsion wellbore fluid comprising: an oleaginous continuous phase; a non-oleaginous discontinuous phase comprising a water-soluble silicate therein; an emulsifier to stabilize the non-oleaginous phase dispersed in the oleaginous phase; and a setting agent; and destabilizing the invert emulsion to allow reaction between the water-soluble silicate and the setting agent.

In yet another aspect, embodiments disclosed herein relate to a method of treating an earth formation that includes emplacing an invert emulsion wellbore fluid comprising: an oleaginous continuous phase; a non-oleaginous discontinuous phase comprising a water-soluble silicate therein; and an emulsifier to stabilize the non-oleaginous phase dispersed in the oleaginous phase; and lowering the pH of the wellbore fluid to cause gelation of the silicate.

In yet another aspect, embodiments disclosed herein relate to a method of treating an earth formation that includes emplacing an invert emulsion wellbore fluid comprising: an oleaginous continuous phase comprising at least one ester; a non-oleaginous discontinuous phase comprising a water-soluble silicate therein; and an emulsifier to stabilize the non-oleaginous phase dispersed in the oleaginous phase; and lowering the pH of the wellbore fluid to cause gelation of the silicate.

Other aspects and advantages of the invention will be apparent from the following description and the appended claims.

DETAILED DESCRIPTION

Embodiments disclosed herein relate generally to settable fluids and methods for improving wellbore strength, and more particularly, to settable fluids and methods to consolidate and stabilize a wellbore. The term "settable fluid" as used herein refers to any suitable liquid material which may be pumped or emplaced downhole, and will harden over time to form a solid or gelatinous structure and become more resistant to mechanical deformation. In accordance with embodiments of the present disclosure, the wellbore fluids of the present disclosure include a settable invert silicate fluid.

The term "invert emulsion" or "water-in-oil emulsion" refers to emulsions wherein the continuous phase is an oleaginous fluid and the discontinuous phase is an aqueous fluid, which is dispersed within the continuous phase. When combining the two immiscible fluids (aqueous and oleaginous)

without the use of a stabilizing emulsifier, while it is possible to initially disperse or emulsify one fluid within the other, after a period of time, the discontinuous, dispersed fluid droplets coalesce or flocculate, for example, due to the instability of the formed emulsion. Thus, to stabilize the emulsion, an emulsifier may be used. Whether an emulsion turns into a water-in-oil emulsion or an oil-in-water emulsion depends on the volume fraction of both phases and on the type of emulsifier.

Thus, an invert silicate fluid of the present disclosure has an oleaginous external or continuous phase and a silicate brine or solid internal phase. However, to allow for control over the setting of the fluids, the fluids may be formed with water-soluble silicates. Soluble silicates are manufactured by fusing sand ($SiO_2$) with a carbonate such as potassium carbonate or sodium carbonate in a furnace and then dissolving the glass using high pressure steam, forming a viscous liquid often referred to as "waterglass."

A number of water-soluble silicate compounds are known in the art. Such compounds include sodium silicate, potassium silicate, lithium silicate and quaternary ammonium silicates which readily dissolve in water to form solutions therewith.

Further, one skilled in the art would appreciate that the water-soluble silicate may be supplied in either liquid or solid form. One skilled in the art would appreciate that whether a silicate is found in the liquid or solid phase is dependent upon the ratio of $SiO_2$ to $M_2O$. As the ratio of $Si_2O:M_2O$ increases, the rate of dissolution decreases (greater quantities of silica at lower pH). For example, for sodium silicate, a lower $SiO_2$:$Na_2O$ ratio will generally be supplied in liquid form, while a ratio of greater than 2 will generally be found in a hydrated or anhydrous powder form. However, either may be used in forming the invert silicates of the present disclosure. Further, one skilled in the art would appreciate that for silicates with higher ratios, the anion structure may be present as more complex species (high molecular weight complexes vs. lower molecular weight monomer or less complexes species).

Water solubility of such silicates is due to the presence of alkali metal oxides ($M_2O$) which maintain the pH at a level where silica ($SiO_2$) can be dissolved. However, if the pH is neutralized or lowered, the solubility of the silica is reduced and it gels or polymerizes. Silicate gelation refers to the self-polymerization or condensation of soluble silicate structures to form a hydrous, amorphous gel structure of silicate, which rapidly occurs at a pH below 10.5. Further, silicates can also react with multivalent cations (e.g., $Ca^{+2}$, $Mg^{+2}$, $Al^{+3}$, $Fe^{+3}$, etc) to produce insoluble metal silicates or metal silicate gels. For example, upon addition of divalent calcium ions, a monovalent silicate may react with the calcium to form a hydrated calcium silicate.

Inasmuch as the pH of a silicate solution is typically greater than about 10.5, the silica will remain soluble therein. However, when these water-soluble silicates are blended (in sufficient quantity) with insolubilizing setting agents (i.e., crosslinkers or pH modifiers), precipitation or gelation will occur. Thus, a settable wellbore fluid may be provided that comprises an internal silicate phase that may triggered to gel or precipitate such as by change in pH to reduce the solubility of silica and cause gelation or contact with a multivalent setting agent to allow for crosslinking. The amount of silicate provided in or as the internal phase may range from 5 to 50 percent of the aqueous phase.

Thus, setting agents suitable for use in the fluids of the present disclosure include inorganic setting agents as well as organic setting agents. For example, types of inorganic setting agents may include oxides, hydroxides, bicarbonates, or halides of alkaline earth and other metals, such as calcium, magnesium, aluminum, and the like. However, no limitation on the source of multivalent ions is limited by the present disclosure. Thus, other types of setting agents may include bicarbonates, phosphates, polyphosphates, sulfates, etc. Such inorganic setting agents may be included in the external phase of the fluid (or in a second emulsion) so that during emplacement of a fluid in a wellbore, the setting agent is kept separate from silicate internal phase to avoid premature crosslinking of the silicates and setting of the fluid. One skilled in the art would appreciate that the amount of setting agent may be dependent on the amount of silicate present in the fluid, as well as the degree of precipitation desired. However, in various embodiments, the molar ratio of silicate to inorganic setting agent may range from 10:1 to 1:10 or from 6:1 to 1:6.

Alternatively, an organic setting agent may be used which induces gelation by pH modification of the wellbore fluid. Thus, organic setting agents may include compounds which will release acid upon length of time. In particular, compounds that hydrolyze to form acids in situ may be utilized as a setting agent. Such delayed source of acidity may be provided, for example, by hydrolysis of an ester or amide. Illustrative examples of such delayed acid sources include hydrolyzable anhydrides of carboxylic acids, hydrolyzable esters of carboxylic acids; hydrolyzable esters of phosphonic acid, hydrolyzable esters of sulfonic acid and other similar hydrolyzable compounds such as amides that should be well known to those skilled in the art. Exemplary esters include esters of alcohols comprising 2 to 12 carbons, esters derived from mono or polyunsaturated fatty acids having 16 to 24 ester blends comprising isomerized and/or internal olefins, or combinations thereof.

Suitable esters may include carboxylic acid esters so that the time to achieve hydrolysis is predetermined on the known downhole conditions, such as temperature and pH. In a particular embodiment, the organic setting agent may include a formic or acetic acid ester of a C4-C30 alcohol, which may be mono- or polyhydric. Other esters that may find use in triggering gelation of the silicates of the present disclosure include those releasing C1-C6 carboxylic acids, including hydroxycarboxylic acids formed by the hydrolysis of lactones, such as δ-lactone and γ-lactone). In another embodiment, a hydrolyzable ester of C1 to C6 carboxylic acid and a C2 to C30 poly alcohol, including alkyl orthoesters, may be used.

It is well known in the art that temperature, as well as the presence of hydroxide ion source, has a substantial impact on the rate of hydrolysis of esters. For a given acid, for example, formic acid, one of skill in the art can conduct simple studies to determine the time to hydrolysis at a given temperature. It is also known that as the length of the alcohol portion of the ester increases, the rate of hydrolysis decreases. Thus, by systematically varying the length and branching of the alcohol portion of the ester, the rate of release of acid may be controlled, and thus the setting of the wellbore fluid may be predetermined.

Additionally, depending on the expected downhole temperature and corresponding expected hydrolysis rate of the selected ester, it may be desirable to incorporate an enzyme, such as lipases, esterases, and proteases, into the wellbore fluid containing the ester so as to increase the rate of hydrolysis. Incorporation of such enzymes is described, for example, in U.S. Pat. No. 5,678,632, which is herein incorporated by reference in its entirety. Further, while temperatures greater than 120° F. typically do not require the incorporation of an enzyme due to sufficiently high hydrolysis rates, it is contemplated that other esters (having lower hydrolysis rates that would not generally be used) may be used in conjunction with an enzyme to increase the inherently low hydrolysis rate.

Depending on the particular setting agent selected (and its relative solubility in water), the organic setting agent may be included in either the aqueous internal phase of oleaginous external phase. In a particular embodiment, an ester may be used to comprise a portion or all of the oleaginous phase.

The wellbore fluids may include, for example, an oleaginous continuous phase, a non-oleaginous discontinuous phase including at least one silicate, emulsifiers, and a setting agent. The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof. In a particular embodiment, at least a portion of the oleaginous fluid includes at least one hydrolysable ester, such as those described above to allow for lowering of the pH of the wellbore fluid, triggering gelation of the silicates within the wellbore fluid. Thus, in various embodiments, the oleaginous fluid may be formed from 0 to 100 percent by volume of an ester. However, when including an ester, an amount ranging from 3-30 volume percent may be desirable.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. Further, as describe above, the non-oleaginous fluid may include at least one water-soluble silicate therein. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof. In a particular embodiment, various weighting agents may be included in a wellbore fluid.

Conventional methods can be used to prepare the drilling fluids disclosed herein in a manner analogous to those normally used, to prepare conventional oil-based drilling fluids. In one embodiment, a silicate fluid is emulsified in a base oil, and a setting agent (inorganic or organic) may be added to the external phase. In another embodiment, a silicate fluid may be emulsified in a base oil having a setting agent therein. In yet another embodiment, a silicate fluid may be emulsified in a base oil, and a second emulsion comprising the setting agent, for example, a $CaCl_2$ brine may be formed and mixed with the first emulsion. Upon a period of time, the emulsified droplets may begin coalescing, and thus reacting. Alternatively, a silicate fluid is emulsified in an oleaginous fluid formed in part or whole by a hydrolysable ester. Further, depending on the selection of a silicate (liquid or solid), one skilled in the art would appreciate that the setting agent may then be added to one of the oleaginous or aqueous phases.

Further, one skilled in the art would appreciate that any emulsifying agent may be used, including nonionic, cationic or anionic emulsifying agents, as long as a hydrophilic/lipophilic balance sufficient to obtain a stable emulsion of water into oil. Examples of emulsifying agents may include alkyl aryl sulfonates, alkyl sulfonates, alkyl phosphates, alkyl aryl sulfates, ethoxylated fatty acids, amidoamines, imidazolines, ethoxylated amines, ethoxylated phenols, polyoxyethylene fatty acids, esters and ethers, sorbitan esters, sulphate esters, sulphate ether esters, alkyl taurates, phosphate esters, polysiloxane surfactants, polymeric surfactants such as the HYPERMER™ products produced by Croda (Snaith, United Kingdom), and combinations thereof. Blends of these materials as well as other emulsifiers may also be used for this application. In some embodiments, surfactants suitable for invert emulsions may include low HLB surfactants. Low HLB surfactants may include amidoamines, sorbitol esters, and alkyl ethers, among others. In a particular embodiment, the emulsifier may include hydroxylated ethers, such as those produced by the addition reaction between alkanols with alkyl oxides, such as an alkanol ethoxylate. The amount of emulsifier should be sufficient to enable the non-oleaginous liquid to form a stable dispersion of fine droplets in the oleaginous liquid. While this amount may vary depending upon the nature and amount of the oleaginous liquid and non-oleaginous liquid, typically the amount of emulsifier may range from about 1 to 10 percent by weight of the total fluid.

Further, the invert emulsion fluids disclosed herein may further contain additional chemicals depending upon the end use of the fluid so long as they do not interfere with the functionality of the fluids (particularly the emulsion when using invert emulsion displacement fluids) described herein. Other additives that may be included in the wellbore fluids disclosed herein include for example, bridging solids, weighting agents, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds. However, it should be noted that the addition of such agents should not adversely interfere with the properties associated with the ability of the components to solidify as described herein Bridging agents, weighting agents or density materials suitable for use in some embodiments include galena, hematite, magnetite, iron oxides, illmenite, barite, siderite, celestite, dolomite, calcite, and the like. Alternatively, such materials may also include fibrous cellulosic materials, graphite, coke, perlite, etc. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon. Further, one skilled in the art would appreciate that depending on the selection of the bridging agent or weighting agent, such additive may also be used as a setting agent. For example, calcium carbonate may be used to serve the dual purpose of a setting agent as well as a bridging solid.

Wetting agents that may be used in embodiments described herein may include crude tall oil, oxidized crude tall oil, surfactants, organic phosphate esters, modified imidazolines and amidoamines, alkyl aromatic sulfates and sulfonates, and the like, and combinations or derivatives of these. However, the use of fatty acid wetting agents should be minimized so as to not adversely affect the reversibility of the invert emulsion disclosed herein. VERSAWET™ and VERSAWET™ NS are examples of commercially available wetting agents manufactured and distributed by M-I LLC, Houston, Tex. that may be used.

Organophilic clays, typically amine treated clays, may be useful as viscosifiers in the fluid compositions described herein. Other viscosifiers, such as oil soluble polymers, fumed silica, polyamide resins, polycarboxylic acids and soaps may also be used. The amount of viscosifier used in the composition may vary depending upon the end use of the composition. However, normally about 0.1% to 6% by weight is a sufficient range for most applications. VERSAGEL® SUPREME, VG-69™ and VG-PLUS™ are organoclay materials distributed by M-I LLC, and Versa-HRP™ is a polyamide resin material manufactured and distributed by M-I LLC, that may be used.

In the various uses of the invert silicate fluids (such as those described below), the gelation or hardening of the silicate may be triggered by contact of the silicate with an inorganic setting agents or hydrolysis of an organic setting agent. When using an inorganic setting agent that is dispersed in the oleaginous external phase, reaction between the setting agent and the emulsified silicate phase may occur by destabilization of the emulsion, such as by change in external conditions leading to coalescence that may be induced by downhole conditions or for example, by an acid wash. Similarly, when a wellbore fluid is formulated with an organic setting agent that may be present in the internal phase or forming at least a portion or all of the external phase, hydrolysis of the compounds may trigger gelation of the silicates. Optionally, an acid wash may be used to accelerate gelation. In yet other embodiments, when an invert silicate fluid comes into contact with pore water (slightly acidic and rich in multivalent cations), gelation and/or precipitation may occur to block the influx of fluid and pressure into the formation, and also to provide a sealing and stabilizing effect.

As mentioned above, embodiments of the present disclosure may provide for treatment fluids or pills that may be used to stabilize unconsolidated or weakly consolidated regions of a formation. Wellbore stability may also be enhanced by the injection of an invert silicate emulsion into formations along the wellbore. The gelation or precipitation of the silicates may provide for strengthening of the formation along the wellbore upon hardening of the mixture.

In other embodiments, the invert silicate fluids, may be used to combat the thief zones or high permeability zones of a formation. Upon hardening, invert silicate fluids injected into the formation may partially or wholly restrict flow through the highly conductive zones. In this manner, the hardened or gelled silicate may effectively reduce channeling routes through the formation, forcing the treating fluid through less porous zones, and potentially decreasing the quantity of treating fluid required and increasing the oil recovery from the reservoir.

In other embodiments, hardened or gelled silicates may form part of a filter cake, minimizing seepage of drilling fluids to underground formations and lining the wellbore. As another example, embodiments disclosed herein may be used as one component in loss circulation material (LCM) pills that are used when excessive seepage or circulation loss problems are encountered, requiring a higher concentration of loss circulation additives. LCM pills are used to prevent or decrease loss of drilling fluids to porous underground formations encountered while drilling.

The fluid loss pill or diverting treatment may be injected into a work string, flow to the bottom of the wellbore, and then out of the work string and into the annulus between the work string and the casing or wellbore. This batch of treatment is typically referred to as a "pill." The pill may be pushed by injection of other completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Components of the fluid loss pill or diverting treatment may then react to form a plug near the wellbore surface, to significantly reduce fluid flow into the formation.

The fluid loss pill or diverting treatment may be selectively emplaced in the wellbore, for example, by spotting the pill through a coil tube or by bullheading. A downhole anemometer or similar tool may be used to detect fluid flows downhole that indicate where fluid may be lost to the formation. The relative location of the fluid loss may be determined such as through the use of radioactive tags present along the pipe string. Various methods of emplacing a pill known in the art are discussed, for example, in U.S. Pat. Nos. 4,662,448, 6,325,149, 6,367,548, 6,790,812, 6,763,888, which are herein incorporated by reference in their entirety.

Further, while embodiments of the disclosure refer to water soluble silicates as being formed with monovalent cations, one skilled in the art would appreciate that, in some embodiments, water soluble silicates may include complexes of monovalent silicates with divalent silicates. However, incorporation of a divalent silicate may be present in substantially lesser amount (no more than 25%), as compared to monovalent silicate to maintain a degree of water solubility.

EXAMPLES

Various invert emulsion fluids were formulated having the following components, all of which are commercially available, as shown below in Table 1. Specifically, the components include SOFTANOL® 50, an alcohol ethoxylate emulsifier available from Ineos Oxide (Southampton, United Kingdom), HOSTAPUR® SAS 93, an alkyl sulfonate emulsifier available from Clariant Functional Chemicals (Muttenz, Switerland), CRYSTAL®, a 2.0:1 sodium silicate solution available from Ineos Silicas (Warrington, United Kingdom), and VERSAGEL® SUPREME, an organoclay available from M-I LLC (Houston, Tex.). The electrical stability (ES) of the emulsions were also measured and shown in Table 1, where the higher the value, the more stable the emulsion.

TABLE 1

|  | Base Sample | | |
| --- | --- | --- | --- |
| Component | A | B | C |
| SOFTANOL ® 50 (mL) | 2 | — | 2.5 |
| HOSTAPUR ® SAS 93 (g) | 0.5 | 2.5 | — |
| DF1 Base Oil (mL) | 50 | 50 | 50 |
| VERSAGEL ® SUPREME (g) | 1 | 1 | 1 |
| CRYSTAL ® 0100 (mL) | 25 | 25 | 25 |
| ES @ 10 mL CRYSTAL ® | 200 | * | 460 |
| ES @ 25 mL CRYSTAL ® | 135 | 33 | 162 |

To the samples, quantities of magnesite ($MgCO_3$) was added, and the results observed. The observations are shown below in Table 2.

| Sample | Observations after aging at 76° C./30 min | Observations after aging at 76° C./16 hrs |
|---|---|---|
| 15 mL Base A (no solids) | liquid | paste |
| 15 mL Base A + 3 g MgCO$_3$ | liquid | set like cement |
| 15 mL Base A + 4 g MgCO$_3$ | liquid | set like cement |
| 15 mL Base A + 5 g MgCO$_3$ | liquid | set like cement |
| 15 mL Base B (no solids) | liquid | liquid |
| 15 mL Base B + 3 g MgCO$_3$ | liquid | soft paste |
| 15 mL Base B + 4 g MgCO$_3$ | liquid | soft paste |
| 15 mL Base B + 5 g MgCO$_3$ | liquid | soft paste, getting firmer with increasing solids |
| 15 mL Base C (no solids) | liquid | paste |
| 15 mL Base C + 3 g MgCO$_3$ | liquid | set like cement |
| 15 mL Base C + 4 g MgCO$_3$ | liquid | set like cement |
| 15 mL Base C + 5 g MgCO$_3$ | liquid | set like cement |

Advantageously, embodiments disclosed herein provide for direct and invert emulsions that may be used to strengthen wellbores, combat thief zones, and prevent fluid loss. As described above, invert emulsions may be provided in a wide range of formulations to result in gels or solidifactions that may be used to strengthen or consolidate a wellbore. The wide range of formulating options available to produce a range of gels or precipitations of varying physical properties and set times may advantageously be optimised for a specific applications and conditions.

Additionally, embodiments disclosed herein may advantageously provide an effective means for delivering settable silicate fluids, with minimal reaction of the silicate prior to placement. By maintaining the silicate emulsified in an oleaginous external phase, the reaction may be delayed until the fluid is placed. While conventionally use of silicates (as a settable fluid) is limited by the controllability of the silicate gelation or precipitation, the inventors of the present application have advantageously discovered by emulsifying the silicate within an oleaginous phase, delay of gelation/precipitation may be achieved until placed in a wellbore.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A wellbore fluid, comprising:
   an oleaginous continuous phase comprising at least one hydrolysable ester;
   a non-oleaginous discontinuous phase comprising a water-soluble silicate therein; and
   an emulsifier to stabilize the non-oleaginous phase dispersed in the oleaginous phase.

2. The fluid of claim 1, wherein the water-soluble silicate comprises at least one of sodium silicate, potassium silicate, lithium silicate, and quaternary ammonium silicates.

3. The fluid of claim 1, wherein the emulsifier comprises at least one of an alkanol alkoxylate and an alkyl sulfonate.

4. A method of treating an earth formation, comprising:
   emplacing an invert emulsion wellbore fluid comprising:
   an oleaginous continuous phase;
   a non-oleaginous discontinuous phase comprising a water-soluble silicate therein;
   an emulsifier to stabilize the non-oleaginous phase dispersed in the oleaginous phase; and
   an organic setting agent; and
   lowering the pH of the wellbore fluid to cause gelation of the silicate.

5. The method of claim 4, wherein the water-soluble silicate comprises at least one of sodium silicate, potassium silicate, lithium silicate, and quaternary ammonium silicates.

6. The method of claim 4, wherein the organic setting agent lowers the pH.

7. A method of treating an earth formation, comprising:
   emplacing an invert emulsion wellbore fluid comprising:
   an oleaginous continuous phase comprising at least one ester;
   a non-oleaginous discontinuous phase comprising a water-soluble silicate therein; and
   an emulsifier to stabilize the non-oleaginous phase dispersed in the oleaginous phase; and
   lowering the pH of the wellbore fluid to cause gelation of the silicate.

8. The method of claim 7, wherein lowering the pH of the wellbore fluid comprises hydrolysis of the at least one ester.

9. The method of claim 7, wherein the lowering the pH comprises performing an acid wash.

10. The method of claim 7, wherein the water-soluble silicate comprises at least one of sodium silicate, potassium silicate, lithium silicate, and quaternary ammonium silicates.

11. The method of claim 7, wherein the emulsifier comprises at least one of an alkanol alkoxylate and an alkyl sulfonate.

12. A method of treating an earth formation, comprising:
   emplacing an invert emulsion wellbore fluid comprising:
   an oleaginous continuous phase;
   a non-oleaginous discontinuous phase comprising a water-soluble silicate therein; and
   an emulsifier to stabilize the non-oleaginous phase dispersed in the oleaginous phase; and
   lowering the pH of the wellbore fluid to cause gelation of the silicate, wherein lowering the pH of the wellbore fluid comprises allowing the wellbore fluid to come into contact with a formation water.

* * * * *